Patented Feb. 5, 1935

1,990,367

UNITED STATES PATENT OFFICE 1,990,367

METHOD OF REFINING ROSIN

Joseph N. Borglin, Marshallton, Del., assignor to Hercules Powder Company, Wilmington, Del., a corporation of Delaware No Drawing. Application October 8, 1932, Serial No. 636,953

21 Claims. (Cl. 87—2)

This invention relates to improvement in method of refining rosin. More particularly, the method relates to the refining of rosin through the removal of color bodies therefrom. The method may be applied to either wood or gum rosin.

It is well known that wood rosin and the lower grades of gum rosin contain objectionable coloring matter rendering them disadvantageous for use in the commercial arts for use in products where lightness of color is a desirable characteristic. Further, wood rosin and low grade gum rosin have also been recognized to contain certain latent color bodies which, while they do not affect the color of the rosin as such, tend to darken under certain conditions, as for example, on aging of the rosin or in the presence of an alkali and air, as where the rosin is utilized for the manufacture of soap. The presence of latent color bodies in rosin renders such rosin, and especially wood rosin which normally contains latent color bodies, substantially unusable in the production of light colored soaps, sizes, limed varnishes, etc., since where the rosin is an ingredient of such, the latent color bodies darken and deleteriously affect the color of the product.

Now in accordance with this invention, I have found that coloring matter generally and latent color bodies in particular may be largely if not completely removed from rosin by suitable treatment of the rosin with resorcinol and a compound selected from the group consisting of sulfur dioxide, an alkali hydrosulfite, an alkali bisulfite, and an alkali sulfite and an alkali thiosulfate or mixtures thereof, it having been found that such compounds or mixtures thereof very substantially promote and increase the efficiency of the resorcinol, heretofore known as a refining agent for rosin, and hence enables economy in the use of resorcinol and effects increase in the yield and quality of refined rosin.

The treatment, generally speaking, involves contacting of the resorcinol and sulphur dioxide, or another compound of the group described, with rosin to be refined followed by separation of the treating agents together with coloring matter, some rosin and latent color bodies from the main body of rosin. In carrying out the treatment, the rosin may be treated as such or, and as is more desirable, in solution in a suitable solvent, as gasoline, or other light petroleum distillate, turpentine, or other well known solvent for rosin which will be immiscible or capable of being rendered immiscible with the resorcinol and the sulphur dioxide or compound capable of liberating sulphur dioxide.

If desired, contact between the rosin under treatment and the treating agents may be promoted by dissolving the rosin in the resorcinol and subsequently precipitating refined rosin, or where the rosin is treated in solution in a solvent, as gasoline, by agitation or more efficiently by heating, as for example, by refluxing.

In the practical adaptation of this invention, the rosin as such, or in solution as indicated, may be treated with sulphur dioxide in gaseous form or with a compound, such, for example, as anhydrous sodium hydrosulphite $(Na_2S_2O_4)$, anhydrous sodium bisulphite $(NaHSO_3)$, anhydrous sodium sulphite $(Na_2SO_3)$. It will be understood that potassium salts will be the equivalent of the sodium salts given herein by way of example.

As a specific illustration of the practical adaptation of the method in accordance with this invention, for example, 500 parts of gasoline-wood rosin solution (14% rosin grading FF) and 13 parts of resorcinol are heated for 4 hours at a temperature of about 110° C. During the entire heating period a slow stream of gaseous sulphur dioxide is passed through the mass. The latter is then cooled to about 20° C., the gasoline-rosin solution decanted from the resorcinol and coloring matter dissolved therein, the solution water-washed and the gasoline evaporated for the recovery of refined rosin. As a result an 85% yield of an M grade rosin will be recovered.

As a further illustration, for example, to 500 parts of a 14% solution of FF wood rosin in gasoline are added 13 parts resorcinol and one part sodium hydrosulphite. The mixture may be intimately contacted by violent agitation or more desirably, for example, by refluxing for one hour followed by cooling to about 20° C. to permit separation of the sodium hydrosulphite and resorcinol from the gasoline-rosin solution. The mixture will separate into an upper layer comprising substantially gasoline-refined rosin solution and a lower layer comprising substantially resorcinol-sodium hydrosulphite, coloring matter and latent color bodies and some rosin. After separation the gasoline-rosin layer is drawn or decanted off, desirably washed with water or with alcohol to remove any residual resorcinol remaining therein and finally the gasoline is evaporated off for recovery of refined rosin. The rosin recovered will be found to be of a greatly improved color; i. e. light, and will be found to be largely free from latent color bodies, thus enabling its use for the production of, for example, a soap, without darkening. In the example given involving the treatment as indicated of FF wood rosin, a yield of about 83% of rosin grading N in color will be obtained.

As further illustrative, for example, following the above illustration but with the use of, for example, 5 parts of sodium hydrosulphite in place of 1 part, a yield of about 86% of rosin, grading WG in color will be obtained.

As a further illustration, for example, 500 grams of gasoline-rosin solution (14% rosin grading FF in color) are refluxed for about four hours with 13 grams of resorcinol and 5 grams of anhydrous sodium bisulphite. The mass is then cooled to 20° C., gasoline-rosin solution decanted, water washed and evaporated. A yield of about 91.5% of refined rosin grading M in color will be obtained.

As a further illustration, for example, the above illustration using anhydrous sodium bisulphite may be followed with the use of anhydrous sodium sulphite. Where anhydrous sodium sulphite is used a yield of about 90% of rosin grading M in color will be obtained.

If desired, the rosin or rosin solution may be treated with the resorcinol and a solid compound of the group described in solution in a suitable solvent therefor which will be immiscible or capable of being rendered immiscible with the rosin solvent where the rosin is treated in solution. As solvents for the resorcinol and sodium hydrosulphite there may be used, for example, an organic solvent, as an aliphatic alcohol, ethyl, methyl, etc. alcohol, acetone, etc., etc. When sulphur dioxide in gaseous form is used the sulphur dioxide will be bubbled through a mixture of the resorcinol and gasoline-rosin solution.

As illustrative of the procedure using a solution of resorcinol and anhydrous sodium hydrosulphite in a solvent, for example, 300 parts of a solution of rosin in gasoline (15% rosin) is heated to say a temperature of about 50° C. to solution with 11 parts resorcinol, 1 part of sodium hydrosulphite and 30 parts of 85% alcohol. The solution, grading "N" in color is obtained, then cooled to a temperature of say about 15° C. and permitted to separate into an upper layer including gasoline-rosin solution and a lower layer including resorcinol-sodium-hydrosulphite-color body solution in alcohol, which is drawn off. The upper layer comprising gasoline purified rosin solution is then washed with about 1 part by volume of about 85% alcohol for removal of any remaining resorcinol, water washed and the gasoline evaporated. A 62% yield of rosin grading "N" in color is obtained.

As a further illustration, for example, 500 grams of a 15% solution of wood rosin grading FF in color, 15 grams of resorcinol and 5 grams of hydrated sodium thiosulfate are refluxed in any suitable form of apparatus for about 4 hours at a temperature of about 110° C. The mass is then cooled, the rosin solution decanted and washed with water. On evaporation of the rosin solvent, which may be, for example, by gasoline, a yield of about 76% of rosin grading M+ in color will be obtained. If desired the procedure outlined may be followed using anhydrous sodium thiosulfate in place of the hydrated salt with a yield of about 85% of rosin grading M in color.

In carrying out this invention, the amount of resorcinol and of a compound of the group indicated to be used is not essential. Desirably, however, where such a compound is used the resorcinol will be used in amount of 1.0–10 parts and the compound will be used in amount of about 0.01–10 parts on the basis of 100 parts of, for example, 14% rosin solution.

It is appreciated that the use of heat for effecting contact between the rosin and resorcinol-sulphur dioxide, or other compound is not essential but is desirable for promoting efficient contact. Likewise, cooling is non-essential, unless heat has been applied, but desirable for promoting efficient separation.

This application is a continuation in part of my application filed June 29, 1931, Serial No. 547,786. What I claim and desire to protect by Letters Patent is:

1. The method of refining rosin which includes subjecting rosin to treatment simultaneously with resorcinol and sulphur dioxide gas.

2. The method of refining rosin which includes subjecting rosin in solution in a solvent capable as such of substantial immiscibility with resorcinol to treatment simultaneously with resorcinol and sulphur dioxide gas.

3. The method of refining rosin which includes subjecting rosin in solution in gasoline to treatment simultaneously with resorcinol and sulphur dioxide gas.

4. The method of refining rosin which includes subjecting rosin in solution in a solvent capable as such of substantial immiscibility with resorcinol to treatment simultaneously with resorcinol and sulphur dioxide gas in the presence of heat.

5. The method of refining rosin which includes subjecting rosin in solution in gasoline to treatment simultaneously with resorcinol and sulphur dioxide gas in the presence of heat.

6. The method of refining rosin which includes subjecting rosin to treatment with a mixture of resorcinol and sodium hydrosulphite.

7. The method of refining rosin which includes subjecting wood rosin to treatment with a mixture of resorcinol and sodium hydrosulphite.

8. The method of refining rosin which includes admixing rosin in solution in a solvent capable as such of substantial immiscibility with resorcinol and sodium hydrosulphite with a mixture of resorcinol and sodium hydrosulphite.

9. The method of refining rosin which includes admixing rosin in solution in gasoline with a mixture of resorcinol and sodium hydrosulphite.

10. The method of refining rosin which includes admixing rosin in solution in a solvent capable as such of substantial immiscibility with resorcinol and sodium hydrosulphite with a mixture of resorcinol and sodium hydrosulphite, separating resorcinol and sodium hydrosulphite from rosin-solvent solution and recovering rosin from the rosin-solvent solution.

11. The method of refining rosin which includes admixing rosin in solution in a solvent capable as such of substantial immiscibility with resorcinol and sodium hydrosulphite with a mixture of resorcinol and sodium hydrosulphite, separating resorcinol and sodium hydrosulphite from rosin-solvent solution, washing the rosin-solvent solution to remove residual resorcinol and recovering rosin from the rosin-solvent solution.

12. The method of refining rosin which includes admixing rosin in solution in a solvent capable as such of substantial immiscibility with resorcinol and sodium hydrosulphite with a mixture of resorcinol and sodium hydrosulphite, heating the mixture, cooling the mixture, separating resorcinol and sodium hydrosulphite from rosin-solvent solution, washing the rosin-solvent solution to remove residual resorcinol and recovering rosin from the rosin-solvent solution.

13. The method of refining rosin which includes admixing rosin in solution in a solvent capable as such of substantial immiscibility with resorcinol and sodium hydrosulphite with resorcinol and sodium hydrosulphite in solution in a solvent capable as such of substantial immiscibility with the rosin solvent.

14. The method of refining rosin which includes admixing rosin in solution in a solvent capable as such of substantial immiscibility with resorcinol and sodium hydrosulphite with resorcinol and sodium hydrosulphite in solution in alcohol.

15. The method of refining rosin which includes admixing rosin in solution in a solvent capable as such of substantial immiscibility with resorcinol and sodium hydrosulphite with resorcinol and sodium hydrosulphite in solution in acetone.

16. The method of refining rosin which includes admixing rosin in solution in gasoline with resorcinol and sodium hydrosulphite in solution in alcohol.

17. The method of refining rosin which includes subjecting rosin to treatment with a mixture of resorcinol and a hydrosulphite.

18. The method of refining rosin which includes subjecting rosin to treatment with a mixture of resorcinol and a compound selected from the group consisting of sulfur dioxide gas, an alkali hydrosulphite, an alkali bisulphite, an alkali sulfite, and an alkali thiosulfate.

19. The method of refining rosin which includes subjecting rosin to treatment with a mixture of resorcinol and a compound selected from the group consisting of sulfur dioxide gas, an alkali hydrosulphite, an alkali bisulfite, an alkali sulfite, and an alkali thiosulfate, the rosin being treated in solution in a solvent capable as such of substantial immiscibility with the resorcinol and said compound.

20. The method of refining rosin which includes subjecting rosin to treatment with a mixture of resorcinol and a compound selected from the group consisting of sulfur dioxide gas, an alkali hydrosulphite, and alkali bisulfite, an alkali sulfite, and an alkali thiosulfate, the rosin being heated in solution in gasoline.

21. The method of refining rosin which includes subjecting rosin to treatment with a mixture of resorcinol and a compound selected from the group consisting of sulfur dioxide gas, an alkali hydrosulphite, an alkali bisulphite, an alkali sulfite, and an alkali thiosulfate, the rosin being treated in solution in a solvent capable as such of substantial immiscibility with the resorcinol and said compound and the resorcinol and said compound being in solution in a solvent capable as such of substantial immiscibility with the solvent for the rosin.

JOSEPH N. BORGLIN.